July 8, 1947.　　　　　F. E. ALTMAN　　　　　2,423,676
EYEPIECE
Filed Nov. 20, 1943

FIG. 1.

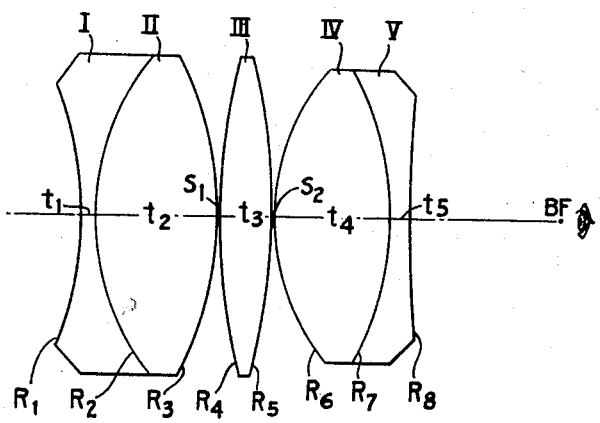

FIG. 3.

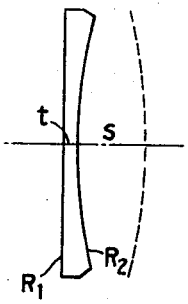

FIG. 2.

| EF = 100 mm. | | | | Ptz. Sum = +.0046 | |
|---|---|---|---|---|---|
| LENS | $N_D$ | V | RADII | | THICKNESSES |
| I | 1.649 | 33.8 | $R_1$ = −181.9 | | $t_1$ = 9.3 |
| II | 1.611 | 57.2 | $R_2$ = +129.8 | | $t_2$ = 64.4 |
|  |  |  | $R_3$ = −175.8 | | $S_1$ = 0.7 |
| III | 1.620 | 60.3 | $R_4$ = +326.0 | | $t_3$ = 28.3 |
|  |  |  | $R_5$ = −326.0 | | $S_2$ = 0.7 |
| IV | 1.611 | 57.2 | $R_6$ = +115.0 | | $t_4$ = 60.5 |
| V | 1.673 | 32.2 | $R_7$ = −154.7 | | $t_5$ = 11.0 |
|  |  |  | $R_8$ = +1540. | | BF = 66.4 |

FIG. 4.

| EF = 100 mm. | | | 25° LATERAL COLOR = +.017 | | Ptz. Sum = +.0051 |
|---|---|---|---|---|---|
| LENS | $N_D$ | V | RADII | | THICKNESSES |
| I | 1.720 | 29.3 | $R_1$ = −158.0 | | $t_1$ = 11.9 |
| II | 1.697 | 56.1 | $R_2$ = +132.0 | | $t_2$ = 93.3 |
|  |  |  | $R_3$ = −187.8 | | $S_1$ = 0.9 |
| III | 1.620 | 60.3 | $R_4$ = +305.5 | | $t_3$ = 27.7 |
|  |  |  | $R_5$ = −305.5 | | $S_2$ = 0.9 |
| IV | 1.697 | 56.1 | $R_6$ = +211.1 | | $t_4$ = 59.3 |
| V | 1.720 | 29.3 | $R_7$ = −95.0 | | $t_5$ = 10.6 |
|  |  |  | $R_8$ = −329.0 | | BF = 82.6 |

FIG. 5.

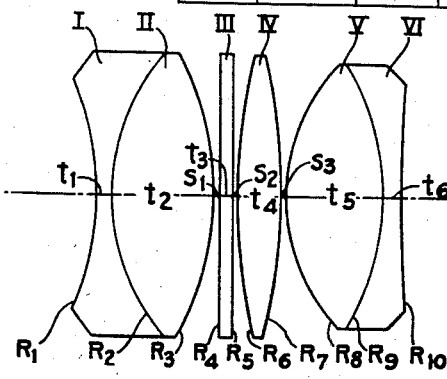

FRED E. ALTMAN
INVENTOR
BY
ATT'Y & AGT

Patented July 8, 1947

2,423,676

UNITED STATES PATENT OFFICE 2,423,676

EYEPIECE

Fred E. Altman, Rochester, N. Y., assignor to Eastman Kodak Company, Rochester, N. Y., a corporation of New Jersey Application November 20, 1943, Serial No. 511,061

7 Claims. (Cl. 88—57)

This invention relates to eyepieces for optical sighting devices and particularly to those comprising a plurality of positive components spaced apart an aggregate distance less than one-third the focal length of the eyepiece, at least one of said components being compound.

An object of the invention is to provide an eyepiece with a large angular field of view, with small astigmatism, and with a small Petzval sum.

An object of a preferred form of the invention is to provide an eyepiece with a small Petzval sum and with small astigmatism over a large field of view suitable for use in optical sighting devices as described in my copending application, Ser. No. 511,062, filed concurrently herewith.

It is usual in eyepieces of this kind to flatten the field curvature by means of cemented surfaces with considerable negative power and with a large index difference. This in itself tends to make astigmatism worse by increasing the positive Petzval sum.

According to the present invention the Petzval sum and the astigmatism are improved by making the cemented surface or surfaces with small index difference or weak power or both.

The average index difference at the cemented surfaces should be less than 0.08 and preferably less than 0.05, while the average power of the cemented surfaces should be less than 0.05 P where P is the power of the whole eyepiece.

The objects of the invention are attained to a satisfactory degree by an average index difference less than 0.08 combined with an average power weaker than 0.05 P or with one of the other features to be described below, or according to a slightly different arrangement, by an index difference less than 0.05 independently of the power. The small index difference is particularly useful when used in conjunction with sighting systems according to my invention disclosed in my copending application, mentioned above wherein the eyepiece has an inward curving field which is balanced by an over-corrected field curvature in the rest of the optical system.

According to another feature of the invention the Petzval sum is also reduced by making the refractive index of at least one positive element greater than 1.65. Its dispersive index should be greater than 40 for the purpose of chromatic correction, specifically the correction of lateral color.

I prefer to combine with my invention the known feature of the positive component farthest from the eye being meniscus in shape with its concave surface facing away from the eye and having a radius of curvature less than five times the focal length of the eyepiece. This feature further reduces the Petzval sum and also increases the eyepoint distance and thus cooperates directly with the other features of my invention.

A particular type of eyepiece which is especially suited to embody the invention is the one having three positive components of which the outer two are compound. This arrangement is more effective for the control of lateral color than having only one component or two adjacent components compound.

Eyepieces according to the invention lend themselves very easily to use with various accessories such as a filter between the components, a supplementary field lens, or a reticle in the focal plane. It is know practice to adapt an eyepiece design for use in different types of instruments or for use with different stop distances, by adding different positive lenses in the field of the eyepiece; that is by designing the eyepiece for the longest possible stop distance required and adapting it to shorter distances by positive field lenses. This saves costs in manufacturing and especially in the repairing of instruments near the field of use. In making use of this feature I find a better arrangement than that heretofore used, is to design the eyepiece for the system with its pupil or apparent stop at the shortest or nearly the shortest distance from the focal plane as compared with other systems in which the eyepiece is to be used. In the systems with longer pupil distance the eyepiece is then combined with a weak negative field lens (rather than positive) which helps further in flattening the field curvature. By "weak" is meant "with a focal length longer than about four times that of the eyepiece."

In the accompanying drawing:

Fig. 1 shows an eyepiece according to the invention.

Fig. 2 gives constructional data for one embodiment corresponding to Fig. 1.

Fig. 3 shows a weak negative field lens for use with the eyepiece of Figures 1 and 2.

Fig. 4 shows constructional data for a preferred embodiment corresponding to Figure 1.

Fig. 5 shows an eyepiece according to the invention with a filter glass between components.

Data for five examples, including the two given in the drawing, are shown in the following tables in which the index N is given for the D line of the spectrum. The focal length in each case is scaled up to 100 mm. for easy comparisons, and the radii and thicknesses are given in millimeters corresponding to this focal length.

*Example 1, Figs. 1 and 2*

| Lens | N | V | Radii | Thicknesses |
|---|---|---|---|---|
| I | 1.649 | 33.8 | $R_1 = -181.9$ | $t_1 = 9.3$ |
| II | 1.611 | 57.2 | $R_2 = +129.8$ | $t_2 = 64.4$ |
|  |  |  | $R_3 = -175.8$ | $s_1 = 0.7$ |
| III | 1.620 | 60.3 | $R_4 = +326.0$ | $t_3 = 28.3$ |
|  |  |  | $R_5 = -326.0$ | $s_2 = 0.7$ |
| IV | 1.611 | 57.2 | $R_6 = +115.0$ | $t_4 = 60.5$ |
| V | 1.673 | 32.2 | $R_7 = -154.7$ | $t_5 = 11.0$ |
|  |  |  | $R_8 = +1540.$ | $BF = 66.4$ |

*Example 2, Figs. 1 and 4*

| Lens | N | V | Radii | Thicknesses |
|---|---|---|---|---|
| I | 1.720 | 29.3 | $R_1 = -158.0$ | $t_1 = 11.9$ |
| II | 1.697 | 56.1 | $R_2 = +132.0$ | $t_2 = 93.3$ |
|  |  |  | $R_3 = -187.8$ | $s_1 = 0.9$ |
| III | 1.620 | 60.3 | $R_4 = +305.5$ | $t_3 = 27.7$ |
|  |  |  | $R_5 = -305.5$ | $s_2 = 0.9$ |
| IV | 1.697 | 56.1 | $R_6 = +211.1$ | $t_4 = 59.3$ |
| V | 1.720 | 29.3 | $R_7 = -95.0$ | $t_5 = 10.6$ |
|  |  |  | $R_8 = -329.0$ | $BF = 82.6$ |

*Example 3, Fig. 5*

| Lens | N | V | Radii | Thicknesses |
|---|---|---|---|---|
| I | 1.649 | 33.8 | $R_1 = -181.9$ | $t_1 = 9.3$ |
| II | 1.611 | 57.2 | $R_2 = +129.8$ | $t_2 = 64.4$ |
|  |  |  | $R_3 = -176.3$ | $s_1 = 2.8$ |
| III | 1.523 | 58.6 | $R_4 = \infty$ | $t_3 = 7.1$ |
|  |  |  | $R_5 = \infty$ | $s_2 = 2.8$ |
| IV | 1.620 | 60.3 | $R_6 = +373.3$ | $t_4 = 28.3$ |
|  |  |  | $R_7 = -291.0$ | $s_3 = 0.7$ |
| V | 1.611 | 57.2 | $R_8 = +115.0$ | $t_5 = 60.5$ |
| VI | 1.673 | 32.2 | $R_9 = -154.9$ | $t_6 = 11.0$ |
|  |  |  | $R_{10} = +1540.$ | $BF = 66.6$ |

*Example 4, Fig. 1*

| Lens | N | V | Radii | Thicknesses |
|---|---|---|---|---|
| I | 1.6725 | 32.2 | $R_1 = -143.2$ | $t_1 = 10.4$ |
| II | 1.6203 | 60.3 | $R_2 = +314.4$ | $t_2 = 72.4$ |
|  |  |  | $R_3 = -137.0$ | $s_1 = 0.8$ |
| III | 1.6203 | 60.3 | $R_4 = +367.0$ | $t_3 = 31.8$ |
|  |  |  | $R_5 = -367.0$ | $s_2 = 0.8$ |
| IV | 1.6203 | 60.3 | $R_6 = +131.4$ | $t_4 = 68.0$ |
| V | 1.6725 | 32.2 | $R_7 = -174.1$ | $t_5 = 12.4$ |
|  |  |  | $R_8 = +1730.$ | $BF = 66.9$ |

*Example 5, Fig. 1*

| Lens | N | V | Radii | Thicknesses |
|---|---|---|---|---|
| I | 1.6725 | 32.2 | $R_1 = -115.0$ | $t_1 = 11.4$ |
| II | 1.6110 | 58.8 | $R_2 = +283.6$ | $t_2 = 68.6$ |
|  |  |  | $R_3 = -123.5$ | $s_1 = 0.7$ |
| III | 1.6110 | 58.8 | $R_4 = +423.8$ | $t_3 = 30.1$ |
|  |  |  | $R_5 = -423.8$ | $s_2 = 0.7$ |
| IV | 1.6110 | 58.8 | $R_6 = +116.6$ | $t_4 = 64.5$ |
| V | 1.6725 | 32.2 | $R_7 = -180.1$ | $t_5 = 11.4$ |
|  |  |  | $R_8 = +1560.$ | $BF = 76.0$ |

These eyepieces were designed for use in systems with pupil positions approximately as listed below, the pupil position being the distance of the pupil of the objective system in front of the focal plane. The corresponding exit pupil position or eye point distance as measured from the vertex of the back surface is also given.

|  | Extreme Pupil Position | Eye Point Distance |
|---|---|---|
|  | Mm. | Mm. |
| Ex. 1 | 410. | 91. |
| Ex. 2 | 620. | 99. |
| Ex. 3 | 385. | 93. |
| Ex. 4 | 300. | 100. |
| Ex. 5 | 497. | 96. |

In practice the eyepoint distance tends to be somewhat less than the paraxial value given here, on account of spherical aberration of the rays forming the image of the entrance pupil.

The field lens shown in Fig. 3 can be combined with any of the eyepieces in Examples 1 to 5, but was particularly designed to combine with the eyepiece in Fig. 1. It modifies that eyepiece for use with a pupil distance of about 690 mm. in the objective system instead of 485 as in the original eyepiece. The constructional data for this field lens are as follows:

Field lens, Fig. 2.  EF = 558 mm.

| Lens | N | V | Radii | Thicknesses |
|---|---|---|---|---|
| I | 1.517 | 64.5 | $R_1 = \infty$ | $t = 8.5$ |
|  |  |  | $R_2 = 288.0$ | $s = 33.1$ | where s is the axial spacing in front of the eyepiece.

Some features of the invention are directly evident from the above table of data. All of the examples shown comprise a plurality of positive components which collectively consist of at least four lens elements of which at least one is a negative element cemented to a positive element. All of the examples also have the positive components spaced apart an aggregate distance less than one-third the focal length of the eyepieces. Each example has cemented surfaces at which the average index difference is less than 0.08 and the power is less than 0.05 P, and Example 2 has the preferred index difference less than 0.05 and also the preferred feature of positive elements with refractive index greater than 1.65.

In each example also the surface facing the field is dispersive and has a radius of curvature less than five times the focal length of the eyepiece.

What I claim and desire to secure by Letters Patent of the United States is:

1. An eyepiece for optical sighting devices comprising a plurality of positive components spaced apart an aggregate distance less than F/3 where F is the focal length of the eyepiece in which positive components each outer surface facing another positive component is convex thereto, the front surface of the positive component farthest from the eye position being concave to the front with a radius of curvature smaller than 5F, the eyepiece being characterized by having at least two cemented surfaces joining negative and positive elements in which the power of such surfaces is on the average between zero and minus 0.05/F and the index difference ($N_N - N_P$) at such surfaces is on the average between zero and plus 0.08, where $N_N$ and $N_P$ are the refractive indices of the negative and the positive elements respectively.

2. An eyepiece according to claim 1 further characterized by having at least one positive element with refractive index greater than 1.65 and dispersive index greater than 40.

3. An eyepiece according to claim 1 having three positive components of which the outer two are cemented doublets.

4. An eyepiece for optical sighting devices which comprises a biconvex component between two outer positive components convex thereto and separated therefrom an aggregate distance less than F/3 where F is the focal length of the eyepiece, there being at least one cemented surface which joins a concave face of a negative element to a convex face of a positive element, characterized by the index difference ($N_N - N_P$) at all such cemented surfaces being less on the average than 0.08, where $N_N$ and $N_P$ are the refractive indices of the negative and the positive element respectively, and further characterized by the power of all such cemented surfaces being less on the average than $0.05/F$.

5. An eyepiece according to claim 4 further characterized by having at least one positive element with refractive index greater than 1.65 and dispersive index greater than 40.

6. An eyepiece comprising three positive components spaced apart an aggregate distance less than $F/3$ where F is the focal length of the eyepiece, of which the component farthest from the eye is a compound meniscus component with its concave surface facing the focal plane and having a radius of curvature smaller than 5F, in combination with a weak negative lens at the focal plane of the eyepiece having a focal length numerically greater than 4F whereby the combination is corrected for a relatively greater distance of the entrance pupil than is the eyepiece when used alone.

7. An eyepiece approximately according to the following constructional data:

| Lens | N | V | Radii | Thicknesses |
|---|---|---|---|---|
| I | 1.72 | 29. | $R_1 = -1.6\ F$ | $t_1 = 0.1\ F$ |
| II | 1.70 | 56. | $R_2 = +1.3\ F$ | $t_2 = 0.9\ F$ |
|  |  |  | $R_3 = -1.9\ F$ | $s_1 < 0.1\ F$ |
| III | 1.62 | 60. | $R_4 = +3.1\ F$ | $t_3 = 0.3\ F$ |
|  |  |  | $R_5 = -3.1\ F$ | $s_2 < 0.1\ F$ |
| IV | 1.70 | 56. | $R_6 = +2.1\ F$ | $t_4 = 0.6\ F$ |
| V | 1.72 | 29. | $R_7 = -1.0\ F$ | $t_5 = 0.1\ F$ |
|  |  |  | $R_8 = -3.3\ F$ |  | where the first column lists the lens elements in order beginning at the field end of the eyepiece, the second and third columns give the corresponding refractive indices for the D line of the spectrum and the dispersive index respectively, and where the fourth and fifth columns give the radii of curvature of the optical surfaces, the thicknesses of the lens elements and the spacings between components in order, F being the equivalent focal length of the eyepiece.

FRED E. ALTMAN.

REFERENCES CITED

The following references are of record in the file of this patent:

UNITED STATES PATENTS

| Number | Name | Date |
|---|---|---|
| 1,478,704 | Erfle | Dec. 25, 1923 |
| 1,479,229 | Erfle | Jan. 1, 1924 |
| 2,206,195 | Konig | July 2, 1940 |

FOREIGN PATENTS

| Number | Country | Date |
|---|---|---|
| 499,992 | Germany | June 25, 1930 |
| 409,465 | Great Britain | May 3, 1934 |
| 492,174 | Germany | Feb. 22, 1930 |
| 691,946 | Germany | June 8, 1940 |
| 847,866 | France | July 10, 1939 |
| 126,837 | Great Britain | May 22, 1919 |
| 461,062 | Germany | June 13, 1928 |